(12) United States Patent
Boivin

(10) Patent No.: US 12,407,144 B2
(45) Date of Patent: Sep. 2, 2025

(54) OPTICAL FIBER ASSEMBLY FOR MITIGATING STIMULATED BRILLOUIN SCATTERING

(71) Applicant: INSTITUT NATIONAL D'OPTIQUE, Quebec (CA)

(72) Inventor: Mathieu Boivin, Quebec (CA)

(73) Assignee: INSTITUT NATIONAL D'OPTIQUE, Quebec (CA)

( * ) Notice: Subject to any disclaimer, the term of this patent is extended or adjusted under 35 U.S.C. 154(b) by 755 days.

(21) Appl. No.: 17/837,124

(22) Filed: Jun. 10, 2022

(65) Prior Publication Data
US 2023/0402809 A1 Dec. 14, 2023

(51) Int. Cl.
*H01S 3/00* (2006.01)
*H01S 3/067* (2006.01)

(52) U.S. Cl.
CPC ...... *H01S 3/06716* (2013.01); *H01S 3/06733* (2013.01); *H01S 2301/03* (2013.01)

(58) Field of Classification Search
CPC ............. H01S 3/06716; H01S 3/06733; H01S 2301/03
See application file for complete search history.

(56) References Cited

U.S. PATENT DOCUMENTS

| 6,587,623 B1 | 7/2003 | Papen et al. |
| 7,486,852 B2 * | 2/2009 | Rothenberg ........... G02B 6/022 385/27 |
| 8,731,358 B2 | 5/2014 | Pare et al. |
| 10,254,481 B2 * | 4/2019 | Puckett ................. G02B 6/136 |
| 2010/0238538 A1 * | 9/2010 | Rice .................. C03B 37/02763 65/435 |
| 2011/0280584 A1 * | 11/2011 | Tankala ............. G02B 6/03694 398/141 |

FOREIGN PATENT DOCUMENTS

| EP | 1674901 A1 * | 2/2006 | ......... G02B 6/03644 |
| JP | 2008158227 A * | 7/2008 | ............... G02B 6/02 |
| WO | 2010085605 A1 | 7/2010 | |

* cited by examiner

*Primary Examiner* — Mark Hellner
(74) *Attorney, Agent, or Firm* — Lempia Summerfield Katz LLC

(57) ABSTRACT

An optical fiber assembly for mitigating stimulated Brillouin scattering (SBS) is disclosed that includes an optical fiber and a winding support configured to hold the fiber in a winding arrangement. The fiber includes a core and one or more claddings surrounding the core. The one or more claddings includes an inner doped region contiguous to the core and having a composition including a glass material doped with an acoustic-velocity-lowering and refractive-index-raising dopant and an acoustic-velocity-lowering and refractive-index-lowering dopant. The composition is selected to provide the fiber with an acoustic velocity profile in which the velocity within the inner doped region is equal to or less by at most 0.5% than that within the core. The acoustic velocity profile and the winding arrangement provide SBS mitigation by reducing a mode overlap between an optical mode guided in the core and acoustic modes including guided and leaky acoustic modes.

18 Claims, 8 Drawing Sheets

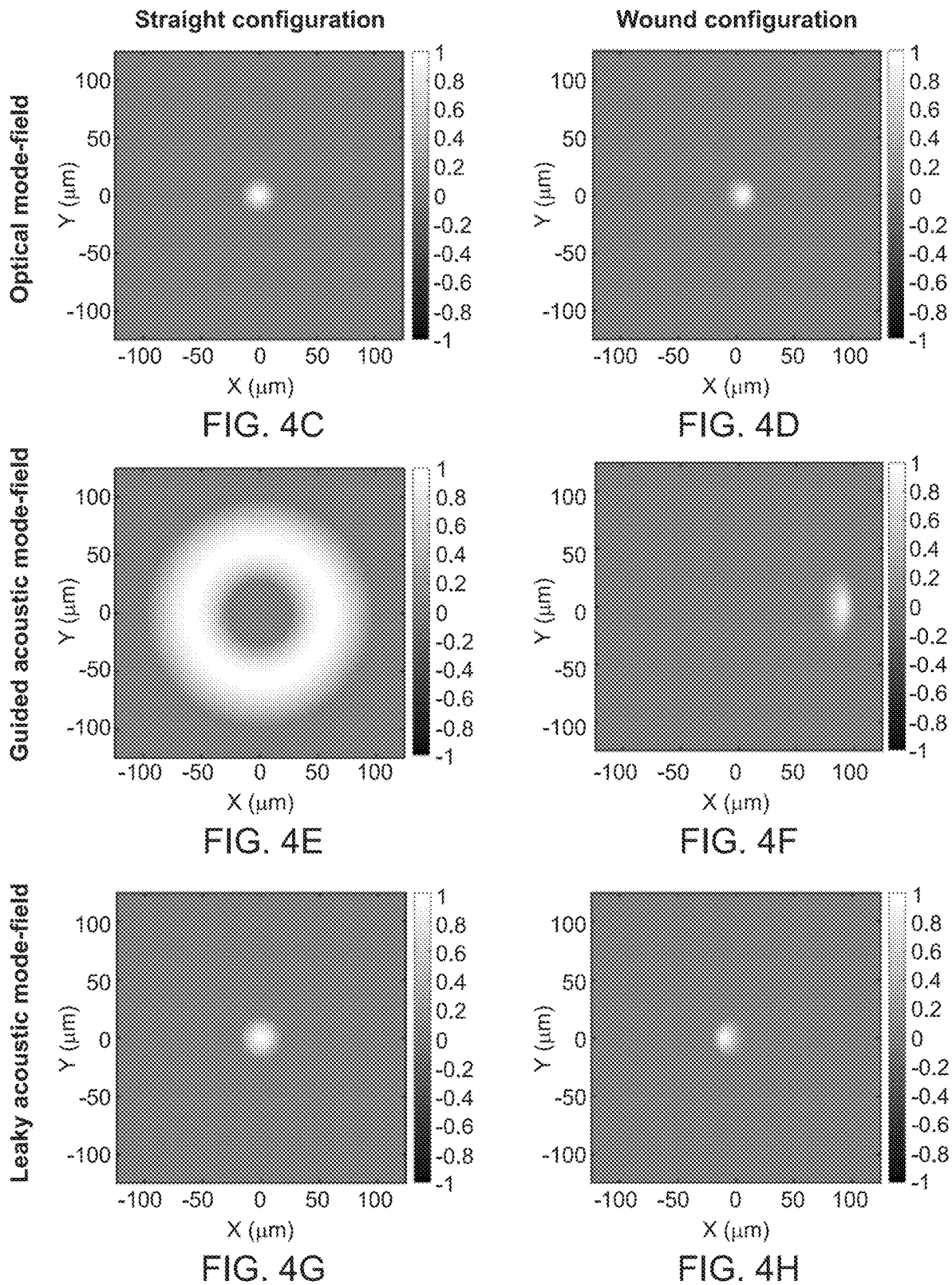

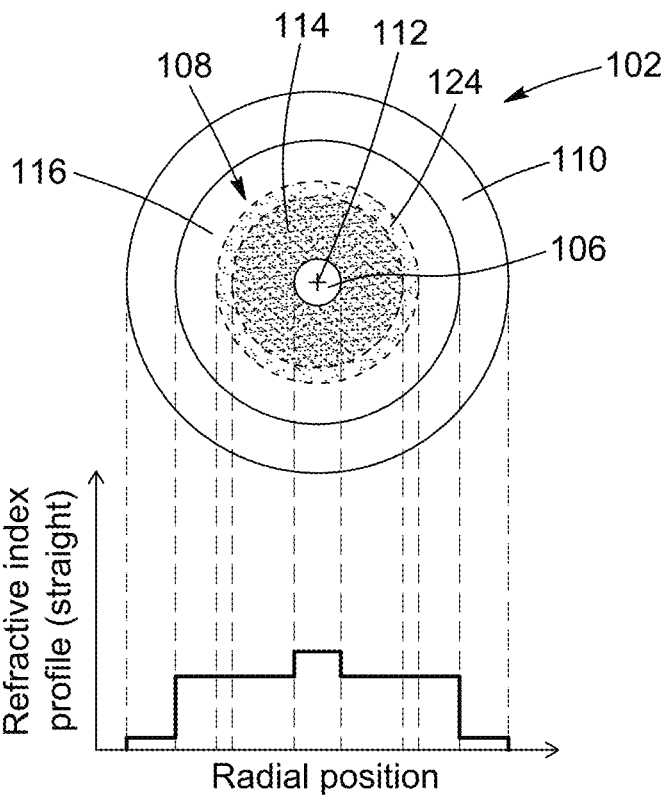
FIG. 6A
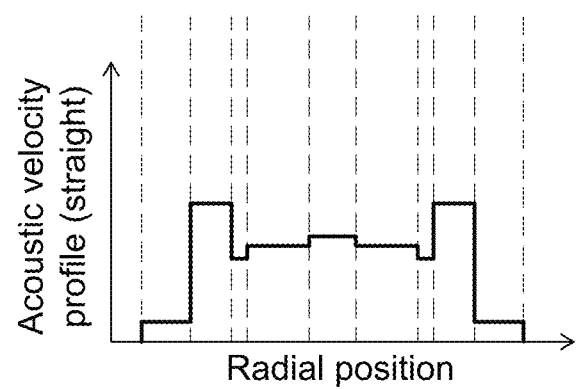
FIG. 6B
FIG. 6C
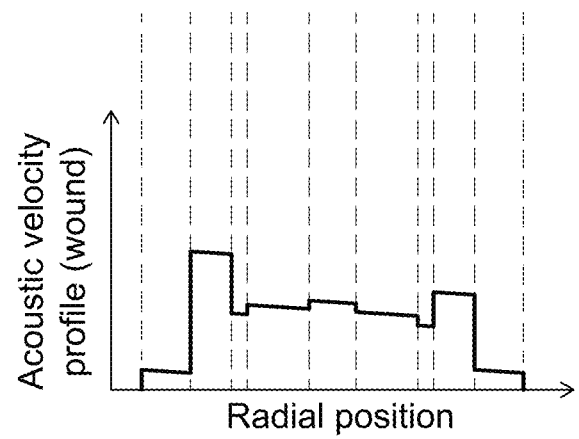
FIG. 6D

OPTICAL FIBER ASSEMBLY FOR MITIGATING STIMULATED BRILLOUIN SCATTERING

TECHNICAL FIELD

The technical field generally relates to optical fibers and, more particularly, to optical fibers having reduced performance limitations due to stimulated Brillouin scattering.

BACKGROUND

Fiber laser and amplifier systems are widely used in high-power applications in fields such as materials processing, medicine, scientific instrumentation, semiconductor device manufacturing, and military technology. One of the limitations in scaling the output power of these systems to higher levels is the onset of nonlinear optical effects such as stimulated Brillouin scattering (SBS), stimulated Raman scattering (SRS), and the optical Kerr effect (OKE). For narrow-linewidth fiber laser and amplifier systems, SBS is generally the first nonlinear effect to appear as the optical power increases. SBS results from the interaction between optical and acoustic waves through electrostriction. SBS manifests itself by the amplification of spontaneous emission of backscattered light that is spectrally shifted with respect to the incident light. Once the power of the input light reaches some critical value, referred to as the SBS threshold, a significant portion of this power is transferred to the backscattered light, which is undesirable or unacceptable in many applications.

Various techniques have been developed for SBS mitigation in optical fibers. These techniques generally attempt to raise the SBS threshold to higher levels. Certain approaches involve modifying the phase-matching condition along the fiber to provide an inhomogeneous broadening of the SBS gain spectrum. This can be achieved by applying a temperature or stress gradient along the length of the fiber, or by concatenating a number of fiber segments having different core compositions. Other approaches involve reducing the spatial overlap between the optical and acoustic modes propagating in the fiber. This can be accomplished through tailoring of the acoustic velocity profile by adjustment of the composition of the different layers making up the fiber. While existing SBS mitigation techniques have worked to varying degrees, challenges remain and there is still a need for further improvement.

SUMMARY

The present description generally relates to techniques for managing SBS in optical fibers.

In accordance with an aspect, there is provided an optical fiber assembly for mitigating stimulated Brillouin scattering (SBS), the optical fiber assembly including:
  an optical fiber including:
    a core extending along a longitudinal fiber axis; and
    one or more claddings surrounding the core and extending along the longitudinal fiber axis, an innermost one of the one or more claddings having a refractive index that is lower than a refractive index of the core, the one or more claddings including an inner doped region contiguous to the core, the inner doped region having a composition including a cladding glass material doped with at least one acoustic-velocity-lowering and refractive-index-raising dopant and at least one acoustic-velocity-lowering and refractive-index-lowering dopant, the composition of the inner doped region being selected to provide the optical fiber with a radial acoustic velocity profile in which a longitudinal acoustic velocity within the inner doped region is equal to or less by at most 0.5% than a longitudinal acoustic velocity within the core; and
  a winding support configured to hold the optical fiber in a winding arrangement,
  wherein the radial acoustic velocity profile and the winding arrangement of the optical fiber provide SBS mitigation by reducing a mode overlap between an optical mode guided in the core and acoustic modes including a guided acoustic mode and a leaky acoustic mode.

In some embodiments, the cladding glass material is silica glass, the at least one acoustic-velocity-lowering and refractive-index-raising dopant includes germanium oxide, phosphorus oxide, or any combination thereof, and the at least one acoustic-velocity-lowering and refractive-index-lowering dopant includes boron oxide, fluorine, or any combination thereof.

In some embodiments, the at least one acoustic-velocity-lowering and refractive-index-raising dopant includes germanium oxide with a concentration ranging from about 0.1 mol % to about 15 mol %, and the at least one acoustic-velocity-lowering and refractive-index-lowering dopant includes fluorine with a concentration ranging from about 0.1 mol % to about 5.0 mol %.

In some embodiments, a ratio of an outer diameter of the inner doped region to an inner diameter of the inner doped region ranges from about 1.1 to about 20.

In some embodiments, the inner doped region extends within the innermost cladding between the core and an outer undoped region of the innermost cladding, and the composition of the inner doped region is selected to provide the inner doped region with a refractive index that matches a refractive index of the outer undoped region.

In some embodiments, the outer undoped region is made of silica glass.

In some embodiments, the one or more claddings include an additional doped region contiguously surrounding the inner doped region, and a composition of the additional doped region is selected to make a longitudinal acoustic velocity within the additional doped region lower than the longitudinal acoustic velocity within the inner doped region.

In some embodiments, the additional doped region extends within the innermost cladding.

In some embodiments, the one or more claddings include a plurality of claddings having different refractive indices, and the inner doped region extends through the entirety of the innermost cladding.

In some embodiments, the one or more claddings include an outer cladding contiguously surrounding the innermost cladding, the outer cladding having a refractive index that is lower than the refractive index of the innermost cladding for guiding pump light inside the innermost cladding.

In some embodiments, the core is composed of a core glass material doped with at least one core dopant. In some embodiments, the core glass material is silica glass, and the at least one core dopant includes germanium oxide, aluminum oxide, phosphorus oxide, fluorine, a rare-earth oxide, or any combination thereof.

In some embodiments, the core includes a central region having a central core composition and a peripheral region surrounding the central region and having a peripheral core composition, and the central core composition and the peripheral core composition are selected to make the longitudinal acoustic velocity within the core higher in the central region than in the peripheral region.

In some embodiments, the core has an outer diameter ranging from about 10 μm to about 60 μm.

In some embodiments, the winding arrangement has an average winding radius ranging from about 3 cm to about 40 cm.

In some embodiments, the optical fiber is a polarization-maintaining fiber and includes at least one stress-applying part disposed within the one or more claddings and extending along the longitudinal fiber axis.

In some embodiments, the at least one stress-applying part extends at least partly within the inner doped region.

In accordance with another aspect, there is provided an optical fiber having reduced stimulated Brillouin scattering (SBS), the optical fiber including:

a core extending along a longitudinal fiber axis; and
one or more claddings surrounding the core and extending along the longitudinal fiber axis, an innermost one of the one or more claddings having a refractive index that is lower than a refractive index of the core, the one or more claddings including an inner doped region contiguous to the core, the inner doped region having a composition including a cladding glass material doped with at least one acoustic-velocity-lowering and refractive-index-raising dopant and at least one acoustic-velocity-lowering and refractive-index-lowering dopant, the composition of the inner doped region being selected to provide the optical fiber with a radial acoustic velocity profile in which a longitudinal acoustic velocity within the inner doped region is equal to or less by at most 0.5% than a longitudinal acoustic velocity within the core, wherein the optical fiber is configured to be wound in a winding arrangement onto a winding support, and
wherein the radial acoustic velocity profile and the winding arrangement of the optical fiber provide SBS mitigation by reducing a mode overlap between an optical mode guided in the core and acoustic modes including a guided acoustic mode and a leaky acoustic mode.

Other features and advantages of the present description will become more apparent upon reading of the following non-restrictive description of specific embodiments thereof, given by way of example only with reference to the appended drawings. Although specific features described in the above summary and the foregoing detailed description may be described with respect to specific embodiments or aspects, it should be noted that these specific features can be combined with one another, unless stated otherwise.

BRIEF DESCRIPTION OF THE DRAWINGS

FIG. 2D, wound configuration) of the optical fiber.

FIGS. 4A to 4H illustrate results of a numerical modal analysis of an optical fiber wound onto a winding support to provide SBS mitigation: radial profile of the refractive index (FIG. 4A) and the longitudinal acoustic velocity (FIG. 4B) of the optical fiber in a straight configuration; cross-sectional views of the mode-field intensity profile of the fundamental optical mode for the optical fiber in a straight (FIG. 4C) and wound configuration (FIG. 4D); cross-sectional views of the mode-field intensity profile of the fundamental guided acoustic mode for the optical fiber in a straight (FIG. 4E) and wound configuration (FIG. 4F); and cross-sectional views of the mode-field intensity profile of the fundamental leaky acoustic mode for the optical fiber in a straight (FIG. 4G) and wound configuration (FIG. 4H).

FIG. 5D, wound configuration) of the optical fiber.

FIG. 6A is a transverse cross-sectional view of an optical fiber, in accordance with another embodiment. FIGS. 6B to 6D illustrate the radial profiles of the refractive index (FIG. 6B, straight configuration) and the longitudinal acoustic velocity (FIG. 6C, straight configuration; FIG. 6D, wound configuration) of the optical fiber.

FIG. 7D, wound configuration) of the optical fiber.

DETAILED DESCRIPTION

Figure 1:
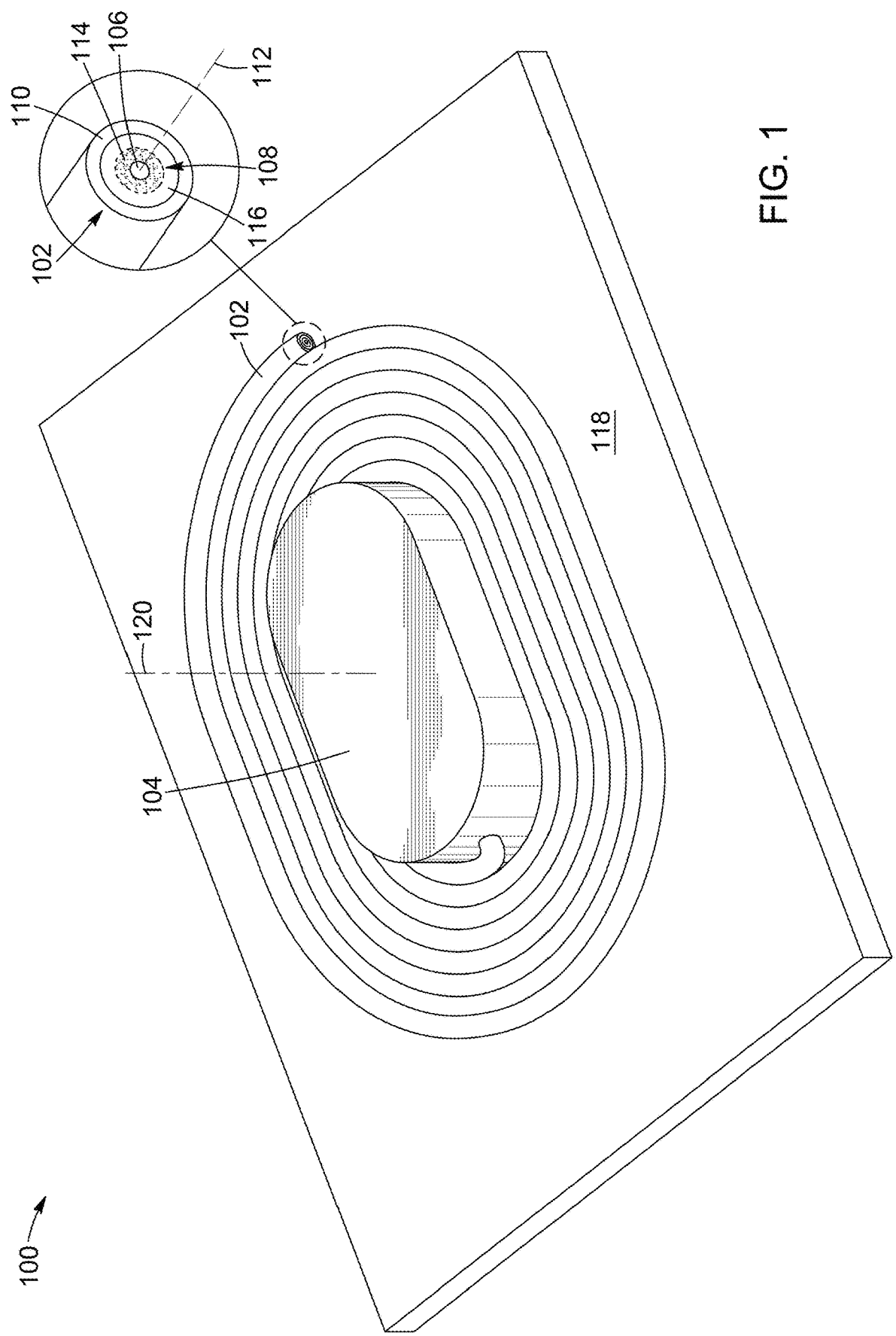
FIG. 1 is a schematic perspective representation of an optical fiber assembly including an optical fiber and a winding support, in accordance with an embodiment.

In the present description, similar features in the drawings have been given similar reference numerals. To avoid cluttering certain figures, some elements may not be indicated if they were already identified in a preceding figure. The elements of the drawings are not necessarily depicted to scale, since emphasis is placed on clearly illustrating the elements and structures of the present embodiments. Furthermore, positional descriptors indicating the location and/or orientation of one element with respect to another element are used herein for ease and clarity of description. Unless otherwise indicated, these positional descriptors should be taken in the context of the figures and should not be considered limiting. Such spatially relative terms are intended to encompass different orientations in the use or operation of the present embodiments, in addition to the orientations exemplified in the figures. Furthermore, when a first element is referred to as being "on", "above", "below", "over", or "under" a second element, the first element can be either directly or indirectly on, above, below, over, or under the second element, respectively, such that one or multiple intervening elements may be disposed between the first element and the second element.

The terms "a", "an", and "one" are defined herein to mean "at least one", that is, these terms do not exclude a plural number of elements, unless stated otherwise.

The term "or" is defined herein to mean "and/or", unless stated otherwise.

Terms such as "substantially", "generally", and "about", which modify a value, condition, or characteristic of a feature of an exemplary embodiment, should be understood to mean that the value, condition, or characteristic is defined within tolerances that are acceptable for the proper operation of this exemplary embodiment for its intended application or that fall within an acceptable range of experimental error. In particular, the term "about" generally refers to a range of numbers that one skilled in the art would consider equivalent to the stated value (e.g., having the same or equivalent function or result). In some instances, the term "about" means a variation of ±10% of the stated value. It is noted that all numerical values used herein are assumed to be modified by the term "about", unless stated otherwise.

The terms "connected" and "coupled", and derivatives and variants thereof, are intended to refer herein to any connection or coupling, either direct or indirect, between two or more elements, unless stated otherwise. For example, the connection or coupling between the elements may be mechanical, optical, electrical, magnetic, thermal, chemical, logical, fluidic, operational, or any combination thereof.

The terms "light" and "optical", and variants and derivatives thereof, are intended to refer herein to radiation in any appropriate region of the electromagnetic spectrum. These terms are not limited to visible light but can also include invisible regions of the electromagnetic spectrum including, but not limited to, the infrared wavelength range. For example, in non-limiting embodiments, the present techniques can be implemented with light having a wavelength band lying somewhere in the range from about 400 nanometers (nm) to about 2000 nm. However, this range is provided for illustrative purposes only and the present techniques may operate outside this range.

Unless stated otherwise, the term "winding", and derivatives and variants thereof, can be used herein interchangeably with other similar terms, such as "coiling" and "bending", and derivatives and variants thereof.

The present description generally relates to techniques for managing SBS in optical fibers. The disclosed techniques generally use a combination of acoustic velocity profile tailoring and fiber coiling to achieve SBS mitigation. The techniques can be used in various applications where it is desirable or required to provide enhanced SBS mitigation in optical fibers, for example, to allow scaling fiber laser and amplifier systems to higher output powers. Non-limiting examples of possible applications include, to name a few, materials processing (e.g., laser welding, cutting, drilling, and micromachining), and narrow-linewidth optical sources (e.g., for use in metrology applications).

Various mitigation strategies have been developed to try to increase the SBS threshold in optical fibers. Certain approaches are based on the broadening of the SBS gain spectrum. Some of these methods have been found to provide limited SBS reduction or be challenging to implement in laser and amplifier systems using large mode area (LMA) fibers. These methods may also involve inhomogeneous imperfections along the fiber length, which can couple optical power from the fundamental mode to higher-order modes, thereby degrading beam quality and modal purity.

Other approaches aim to reduce the spatial overlap between optical and acoustic modes through the tailoring of the acoustic velocity profile, for example, by adjusting the fiber composition to provide acoustically guiding or anti-guiding layers across the fiber cross-section. While many of these approaches can provide a certain degree of SBS reduction, they are limited in that they generally focus on reducing the overlap between the guided optical modes and the guided acoustic modes, but omit to consider the impact of the leaky acoustic modes. Leaky acoustic modes can propagate in optical fibers with non-zero waveguide losses. In contrast to their optical counterparts, leaky acoustic modes can have lifetimes comparable to those of guided acoustic modes due to material damping dominating propagation losses in glass at frequencies of tens of gigahertz. Thus, in many applications, the contribution of leaky acoustic modes should be considered to quantitatively assess SBS suppression in optical fibers. Furthermore, the intensity distribution of acoustic leaky modes tend to be localized in regions where guided acoustic modes are not supported. In other words, an optical fiber provided with an acoustic velocity profile designed to avoid propagation of acoustic guided modes in the core may support leaky acoustic modes having significant overlap with the guided optical modes propagating in the core. These leaky acoustic modes can play a significant role in SBS generation and compromise the effectiveness of SBS reduction schemes that rely solely on the transverse confinement of guided acoustic modes.

The techniques disclosed herein combine acoustic velocity profile tailoring and fiber coiling to reduce the contributions of both guided and leaky acoustic modes to SBS generation. The tailoring of the acoustic velocity profile generally involves doping a cladding region contiguous to the core to make the longitudinal acoustic velocity within the cladding region equal to or slightly lower than the longitudinal acoustic velocity within the core. The provision of a low acoustic velocity contrast at the core-cladding interface favors conditions of weak acoustic guidance. Such conditions make it easier to use fiber coiling to move the acoustic modes away from the optical modes to reduce the mode overlap and, consequently, increase the SBS threshold. More details regarding various aspects, features, and implementations of the present techniques are described below with reference to the figures.

Referring to FIG. 1, there is illustrated a schematic representation of an embodiment of an optical fiber assembly 100 configured for mitigating SBS. The optical fiber assembly 100 generally includes an optical fiber 102 and a winding support 104 onto which the optical fiber 102 is wound in a winding arrangement. The optical fiber 102 can be an active fiber including a gain medium for providing optical amplification, or a passive fiber. For example, the optical fiber 102 can be an active LMA fiber configured to support single-mode or few-mode operation, which can be well suited for use in high-power fiber laser and amplifier systems. Depending on the application, the optical fiber assembly 100 can be provided in an assembled state, as illustrated in FIG. 1, or as a kit. In the case of a kit, the optical fiber assembly 100 can be assembled by winding the optical fiber 102 on the winding support 104. The structure, configuration, composition, and operation of the optical fiber 102, the winding support 104, and other possible components of the optical fiber assembly 100 are described in greater detail below.

Figure 2A:
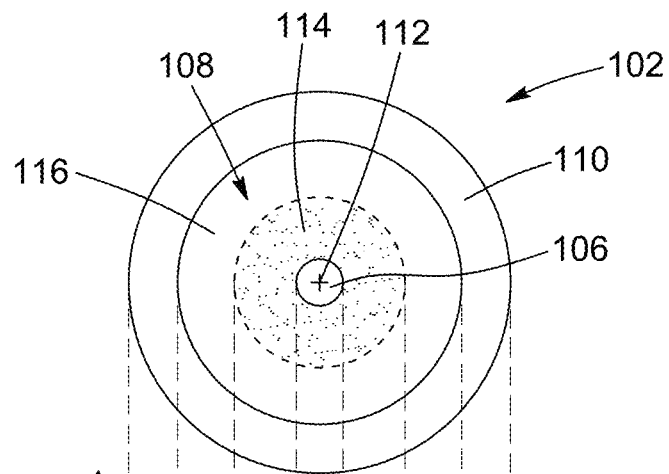
FIG. 2A is a transverse cross-sectional view of the optical fiber of the optical fiber assembly of FIG. 1.
Figure 2B:
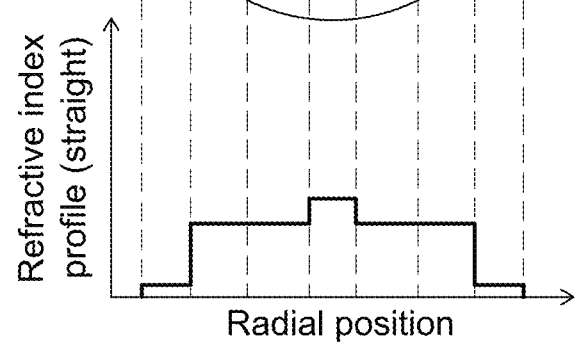
FIGS. 2B to 2D illustrate the radial profiles of the refractive index (FIG. 2B, straight configuration) and longitudinal acoustic velocity (FIG. 2C, straight configuration.
Figure 2C:
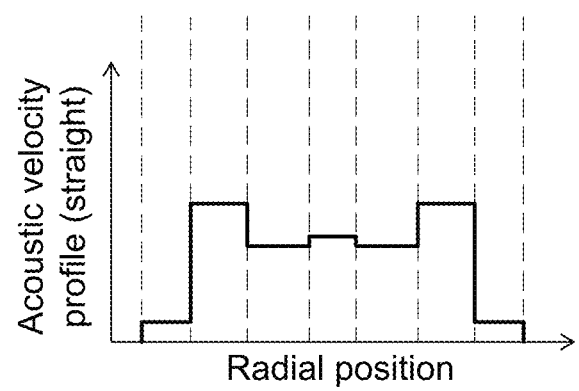
Figure 2D:
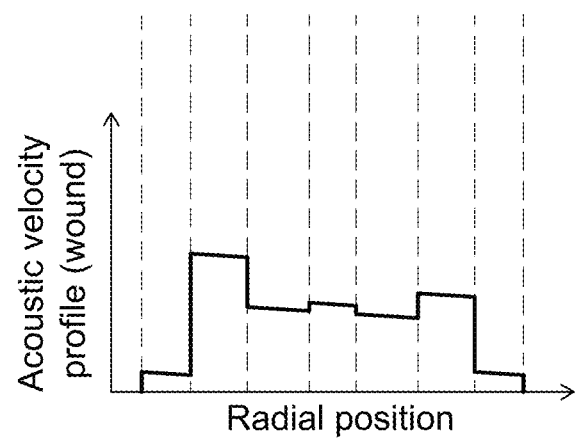

Referring to FIGS. 2A to 2D, a transverse cross-sectional view of the optical fiber 102 of FIG. 1 is illustrated (FIG. 2A), along with the radial profile of the refractive index of the optical fiber 102 in a straight (i.e., unwound) configuration (FIG. 2B) and the radial profile of the longitudinal acoustic velocity of the optical fiber 102 in a straight configuration (FIG. 2C) and in a wound configuration (i.e., with the optical fiber 102 wound onto the winding support 104; FIG. 2D). The optical fiber 102 includes a core 106 and one or more claddings 108, 110 surrounding the core 106. The core 106 and the claddings 108, 110 extend along a longitudinal fiber axis 112 of the optical fiber 102. The optical fiber 102 can also include a number of outer layers (not shown) disposed around the outer cladding 110. Non-limiting examples of such outer layers include a coating layer, a strengthening layer, and a jacket layer. The optical fiber 102 illustrated in FIG. 2A has a double-clad structure, so that the one or more claddings 108, 110 include an innermost (or inner) cladding 108 contiguous to the core 106 and an outer cladding 110 disposed around the inner cladding 108. In other embodiments, the optical fiber 102 can have a single cladding or more than two claddings. In the illustrated embodiment, the core 106 and the claddings 108, 110 have circular transverse cross-sections and are centered relative to the fiber axis 112. However, different geometries can be used in other embodiments, including cores and claddings which have non-circular cross-sections, and cores which are off-centered from the fiber axis.

As shown in the refractive index profile of FIG. 2B, the inner cladding 108 has a refractive index that is lower than a refractive index of the core 106, and the outer cladding 110 has a refractive index that is lower than the refractive index of the inner cladding 108. Such a configuration can be used to guide signal light inside the core 106 and to guide pump light inside the inner cladding 108. In other embodiments, the refractive index of the outer cladding 110 can be greater than that of the inner cladding 108. It is appreciated that the optical fiber 102 can have various refractive index profiles (e.g., graded-index and step-index profiles), and that the refractive index in any one of the core 106, inner cladding 108, and outer cladding 110 can either be uniform or vary with the radial position.

In some embodiments, the core 106 may have an outer diameter ranging from about micrometers (µm) to about 60 µm and a numerical aperture ranging from about 0.06 to about 0.10, the inner cladding 108 may have an outer diameter ranging from about 11 µm to about 400 µm, and the outer cladding 110 may have an outer diameter ranging from about 250 µm to about 600 µm, although values outside these ranges can be used in other embodiments.

Various core compositions can be used. In some embodiments, the core 106 is composed of a core glass material, for example, silica glass, doped with at least one core dopant. Non-limiting examples of possible core dopants include, to name a few, germanium oxide ($GeO_2$); aluminum oxide ($Al_2O_3$); phosphorus oxide ($P_2O_5$); fluorine (F); and rare-earth oxides, such as erbium oxide ($Er_2O_3$), ytterbium oxide ($Yb_2O_3$), and thulium oxide ($Tm_2O_3$); and any combination thereof. In other embodiments, a core glass material other than silica glass can be employed.

Referring still to FIGS. 2A to 2D, the inner cladding 108 includes an inner doped region 114 contiguously surrounding the core 106, and an outer undoped region 116 disposed around the inner doped region 114 and contiguously surrounded by the outer cladding 110. In some embodiments, the ratio of the outer diameter of the inner doped region 114 to its inner diameter (which corresponds to the outer diameter of the core 106) ranges from about 1.1 to about 20, while the ratio of the outer diameter of the inner doped region 114 to the outer diameter of the outer undoped region 116 can range from about 0.05 to about 0.9, although other ratio values can be used in other embodiments. The inner doped region 114 is composed of a cladding glass material doped with two types of dopants, while the outer undoped region 116 is composed of the cladding glass material without any dopants. The first type of dopants is configured to reduce the longitudinal acoustic velocity and increase the refractive index of the inner doped region 114. These dopants are referred to herein as acoustic-velocity-lowering and refractive-index-raising dopants. The second type of dopants is configured to reduce both the longitudinal acoustic velocity and the refractive index of the inner doped region 114. These dopants are referred to herein as acoustic-velocity-lowering and refractive-index-lowering dopants.

The compositions and concentrations of the two types of dopants are selected to make the longitudinal acoustic velocity within the inner doped region 114 equal to or less by at most 0.5% than the longitudinal acoustic velocity within the core 106, as depicted FIG. 2C. For example, in some embodiments, the longitudinal acoustic velocity within the inner doped region 114 can be lower than the longitudinal acoustic velocity within the core 106 by at most 0.01%, or by at most 0.05%, or by at most 0.1%, or by at most 0.15%, or by at most 0.2%, or by at most 0.25%, or by at most 0.3%, or by at most 0.35%, or by at most 0.4%, or by at most 0.45%, or by at most 0.5%. This low acoustic velocity contrast creates weak acoustic guidance conditions in the core 106. As described in greater detail below, these conditions can be leveraged to favor SBS reduction when the optical fiber 102 is wound onto the winding support 104, as it becomes easier to move the acoustic and optical modes away from each other to reduce their overlap. The effect of winding the optical fiber 102 onto the winding support 104 on acoustic wave propagation can be modeled by considering a tilted acoustic velocity profile, as depicted in FIG. 2D.

It is noted that one reason why both types of dopants are configured to reduce the longitudinal acoustic velocity is that in conventional LMA fibers, the longitudinal acoustic velocity is typically higher within the inner cladding than it is within the core. Thus, for such fibers, acoustic-velocity-lowering dopants should be used within the inner doped region 114 to reduce its longitudinal acoustic velocity compared to that of the outer undoped region 116 and bring it closer to that of the core 106. In the acoustic velocity profile depicted in FIG. 2C, the longitudinal acoustic velocity is constant throughout the inner doped region 114. However, in other embodiments, the longitudinal acoustic velocity within the inner doped region 114 can vary as a function of radial position, which can be achieved, for example, by using a non-uniform radial doping profile.

The composition of the inner doped region 114 can also be selected so that the refractive index contributions of the two types of dopants substantially cancel each other out. In this way, the refractive index of the inner doped region 114 is left substantially unchanged by doping and, thus, substantially equal to the refractive index of the outer undoped region 116. It is appreciated that the compositions and concentrations of the two types of dopants can be selected to allow independent control over the refractive index and the longitudinal acoustic velocity of the inner doped region 114.

Various compositions can be used for the cladding glass material and the two types of dopants used in the inner doped region 114 and the outer undoped region 116 of the inner cladding 108. In some embodiments, the cladding glass material can be silica glass. Other types of cladding glass material can be used in other embodiments. Non-limiting examples of acoustic-velocity-lowering and refractive-index-raising dopants include germanium oxide ($GeO_2$), phosphorus oxide ($P_2O_5$), or any combination thereof. Non-limiting examples of acoustic-velocity-lowering and refractive-index-lowering dopants include boron oxide ($B_2O_3$), fluorine (F), or any combination thereof. In some embodiments, the cladding glass material is silica glass, the at least one acoustic-velocity-lowering and refractive-index-raising dopant includes germanium oxide, and the at least one acoustic-velocity-lowering and refractive-index-lowering dopant includes fluorine. In some embodiments, the concentration of germanium oxide can range from about 0.1 mol % to about 15.0 mol %, particularly from about 1.0 mol % to about 5.0 mol %, and the concentration of fluorine can range from about 0.1 mol % to about 5.0 mol %, particularly from about 0.3 mol % to about 1.5 mol %, although concentrations outside these ranges can be used in other embodiments.

In the illustrated embodiment, the outer cladding 110 is made of a material having a refractive index that is lower than that of the inner cladding 108, for example, a low-index glass (e.g., fluorine-doped silica glass) or a low-index polymer. In other embodiments, however, the outer cladding 110 can be made of a material having a refractive index that is greater than that of the inner cladding 108, for example, a high-index polymer. In FIG. 2C, the longitudinal acoustic velocity decreases as one goes from the inner cladding 108 to the outer cladding 110, but this is not a requirement.

Returning to FIG. 1, the winding support 104 is the component of the optical fiber assembly 100 onto which the optical fiber 102 is wound. The winding support 104 can be embodied by any component or combination of components that can provide a winding surface 118 onto which the optical fiber 102 can be wound about a winding axis 120. By way of example, the winding support 104 can include a mandrel, a spool, a bobbin, a reel, a plate, or another suitable component. In some implementations, the winding support 104 can have grooves, threads, or channels (not shown in FIG. 1) formed in or upon its winding surface 118 and configured for receiving therein the optical fiber 102. The winding support 104 may be formed of either a single or a plurality of members, and may be configured to provide a single or a plurality of winding axes about which the optical fiber 102 can be wound to define the winding arrangement.

It is appreciated that the winding arrangement can have various configurations and define both two-dimensional and three-dimensional winding paths. Depending on the application, the winding arrangement can include a portion of a turn, a single turn, or multiple turns of the optical fiber 102 about the winding axis 120. For example, in some embodiments, the number of turns can range from about a few turns to a few tens of turns. The winding arrangement can be characterized by its winding radius, which may or may not be constant along its path. For example, in some embodiments, the winding arrangement can have an average winding radius ranging from about 3 cm to about 40 cm, although other values can be used in other embodiments. The winding arrangement can also be characterized by its shape. Non-limiting examples of shapes include circles, ellipses, ovals, polygons, curved segments having different radii of curvature, combinations of straight and curved segments, and the like.

In the embodiment illustrated in FIG. 1, the winding support 104 is embodied by a plate-shaped body defining a flat winding surface 118 onto which the optical fiber 102 is laid. The winding arrangement defines a two-dimensional, spiral curve including a plurality of turns of increasing size as one moves radially outwardly from the winding axis 120. It is noted that the term "spiral" is meant to encompass both circular and non-circular spiral-like structures.

Figure 3:
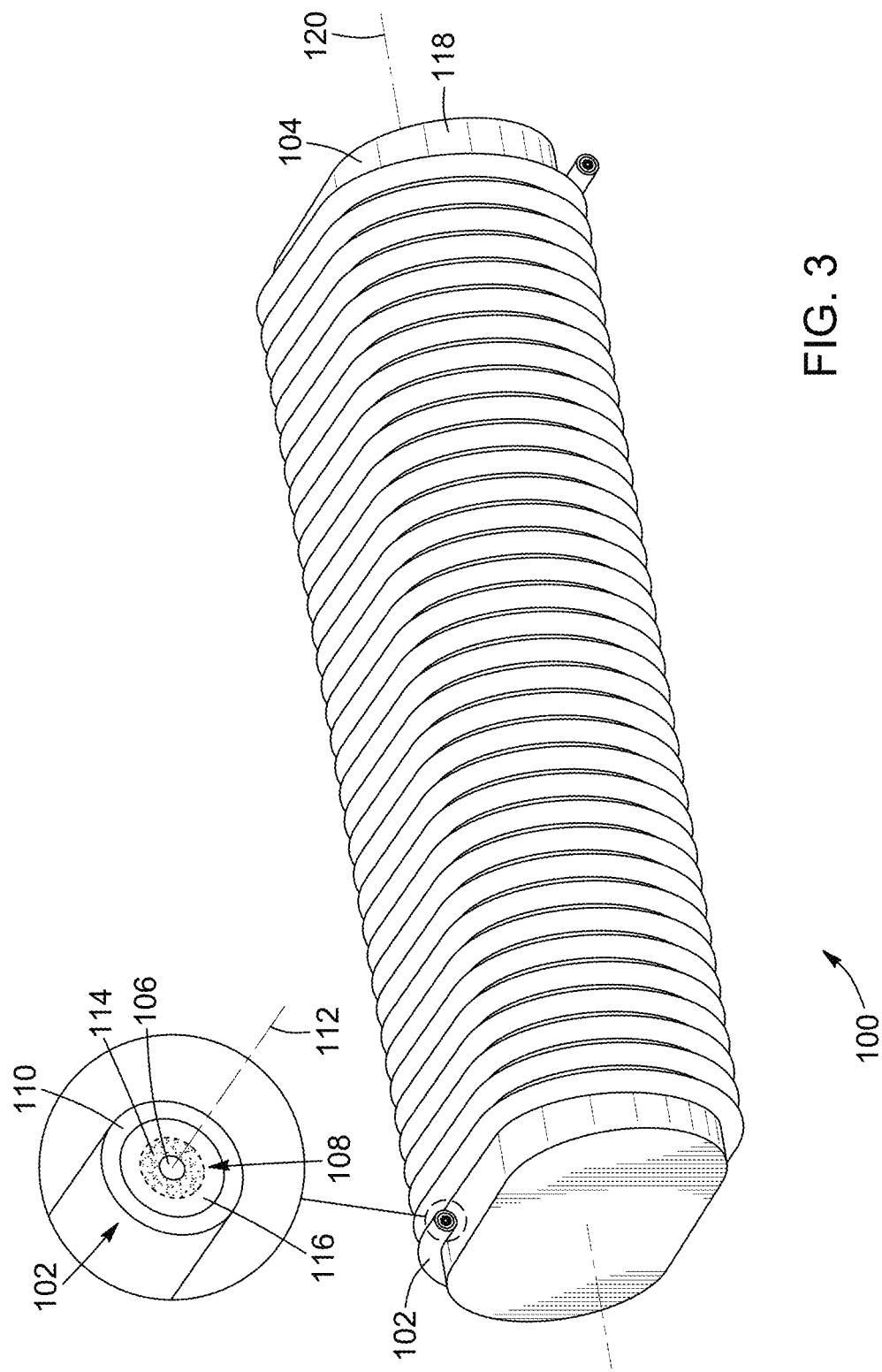
FIG. 3 is a schematic perspective representation of an optical fiber assembly including an optical fiber and a winding support, in accordance with another embodiment.

Referring to FIG. 3, in an alternative embodiment, the winding support 104 is embodied by a rod-shaped body defining a cylindrical winding surface 118 onto which the optical fiber 102 is wrapped. The winding arrangement defines a three-dimensional, helicoidal curve about the winding axis 120. It is noted that the term "helicoidal" is meant to encompass both true helices (i.e., circular helices with a constant radius of curvature) and helix-like structures having a non-constant radius of curvature.

Referring now to FIGS. 4A to 4H, there are provided results of a numerical modal analysis conducted to illustrate certain SBS reduction capabilities of the present techniques.

It is appreciated that the SBS mitigation techniques disclosed herein can have a number of optional features, variations, and applications. In particular, the results described below are provided to illustrate some aspects and capabilities of the present techniques, but should not be construed in any way as limiting their scope.

The computed results shown in FIGS. 4A to 4H were obtained from a model of an optical fiber assembly including an optical fiber and a winding support, in accordance with an embodiment. The optical fiber assembly used in the model was similar to the one depicted in FIG. 1. Relevant model parameters used in the calculations are provided in Table I below. These parameters can correspond to a core 106 made of $SiO_2$ (e.g., 83-98 mol %) doped with $Al_2O_3$ (e.g., 0-7 mol %), $P_2O_5$ (e.g., 0-mol %), and $Yb_2O_3$ (e.g., 0.0-0.5 mol %), an inner doped region 114 made of $SiO_2$ (e.g., 90-98 mol %) doped with $GeO_2$ (e.g., 0.1-5.0 mol %) and F (e.g., 0.1-5.0 mol %), and an outer undoped region 116 made of nominally pure $SiO_2$.

TABLE I

| Model Parameters | | |
|---|---|---|
| Model parameters | | Value |
| Core | Outer diameter (μm) | 36 |
| | Longitudinal acoustic velocity (m/s) | 5720 |
| | Numerical aperture | 0.08 |
| Inner doped region of inner cladding | Outer diameter (μm) | 200 |
| | Longitudinal acoustic velocity (m/s) | 5700 |
| Outer undoped region of inner cladding | Outer diameter (μm) | 250 |
| | Longitudinal acoustic velocity (m/s) | 5970 |
| | Winding radius (cm) | 10 |

Figure 4A:
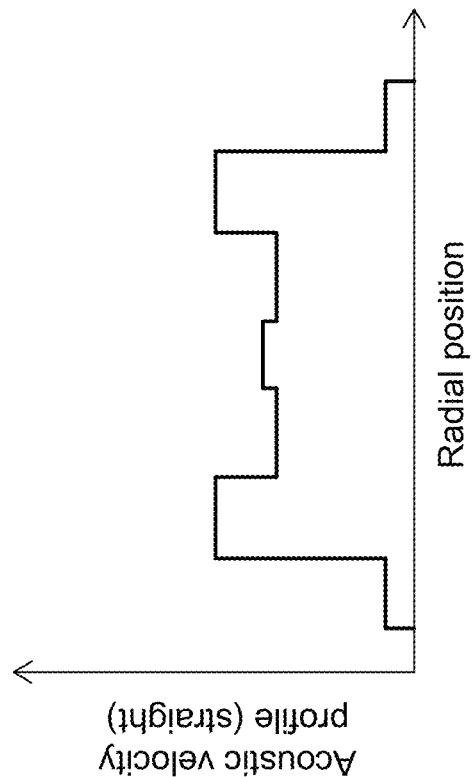
Figure 4B:
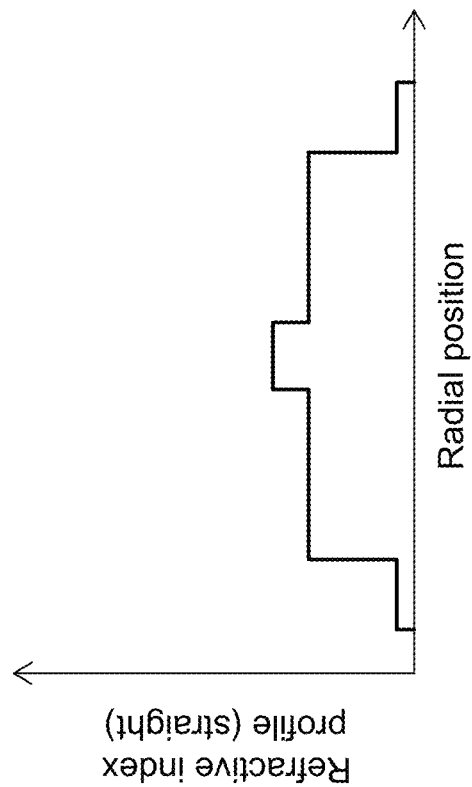

FIGS. 4A and 4B illustrate the computed radial profiles of the refractive index and of the longitudinal acoustic velocity of the optical fiber in a straight configuration, respectively. These profiles are similar to those shown in FIGS. 2B and 2C. As discussed above, doping the inner region of the inner cladding with both an acoustic-velocity-lowering and refractive-index-raising dopant (e.g., germanium oxide) and an acoustic-velocity-lowering and refractive-index-lowering dopant (e.g., fluorine), allows its longitudinal acoustic velocity to be reduced to a value that is just slightly lower than that of the core without significant change in its refractive index.

FIGS. 4C to 4H depict transverse cross-sectional views of various normalized mode-field intensity profiles: fundamental optical mode for the optical fiber in a straight (FIG. 4C) and wound configuration (FIG. 4D); fundamental guided acoustic mode for the optical fiber in a straight (FIG. 4E) and wound configuration (FIG. 4F); and fundamental leaky acoustic mode for the optical fiber in a straight (FIG. 4G) and wound configuration (FIG. 4H). FIGS. 4C and 4D illustrate that the fundamental optical mode is contained largely in the core in a straight configuration (FIG. 4C), and that the winding of the optical fiber tends to push the optical mode away from the winding axis (i.e., to the right side of the core in FIG. 4D). FIGS. 4E and 4F illustrate that the fundamental guided acoustic mode is largely contained within the inner doped region of the inner cladding in a straight configuration (FIG. 4E), and that the winding of the optical fiber tends to push the guided acoustic mode toward the interface between the inner doped region and the outer undoped region of the inner cladding, in an area of the interface that is located away from the winding axis (i.e., to the right side of the inner doped region in FIG. 4F). FIGS. 4G and 4H illustrate that the fundamental leaky acoustic mode is largely contained in the core in a straight configuration (FIG. 4G), and that the winding the optical fiber tends to pull the leaky acoustic mode toward the winding axis (i.e., to the left side of the core in FIG. 4H), and thus away from the fundamental optical mode. The results shown in FIGS. 4E to 4H illustrate that while adjusting the acoustic velocity profile can be sufficient to move the guided acoustic modes away from the fundamental optical mode, reducing the overlap between the leaky acoustic modes and the optical mode can involve both adjusting the acoustic velocity profile and providing the optical fiber in a wound configuration.

It is appreciated that FIGS. 4A to 4H illustrate how the combination of acoustic velocity profile tailoring and fiber coiling according to the present techniques can provide SBS mitigation by reducing the mode overlap between the fundamental optical mode and both the guided (compare FIGS. 4D and 4F) and leaky (compare FIGS. 4D and 4H) acoustic modes.

It is noted that the propagation of acoustic modes in optical fibers can be modelled theoretically by using the Helmholtz equation. Once formulated for the elastic displacement field in a waveguide having a cross-section invariant along the axis of propagation, the Helmholtz equation can be solved to find the acoustic eigenmodes. Analogously to the electromagnetic case, the winding of the optical fiber changes the intensity distribution of the acoustic modes due to the propagation path lengthening with increasing distance from the winding axis. The winding of the optical fiber also causes volumetric strain which affects material density, and thus the acoustic velocity. Both contributions can be modeled by adding a linear tilt to the acoustic velocity profile (see, e.g., FIG. 2D). This tilt tends to push the guided acoustic modes away from the winding axis, as it does for guided optical modes. Conversely, due to their anti-guiding properties, the tilt tends to pull the leaky acoustic modes toward the winding axis, and thus away from the guided optical modes, as can be seen from a comparison of the mode-field intensity profiles depicted in FIGS. 4D and 4H.

It is appreciated that the optical fibers considered above with reference to FIGS. 1 to 4H are provided by way of example only. In general, the composition, cross-sectional shape and size, refractive index profile, acoustic velocity profile, passive or active operation mode, operating wavelength range, polarization-maintaining (PM) properties, and other core, cladding, and fiber properties and characteristics can be varied in accordance with a specified application. Other non-limiting examples of optical fibers that can be used to implement the SBS mitigation techniques disclosed herein are described below with reference to FIGS. 5A to 5D, 6A to 6D, and 7A to 7D.

Figure 5A:
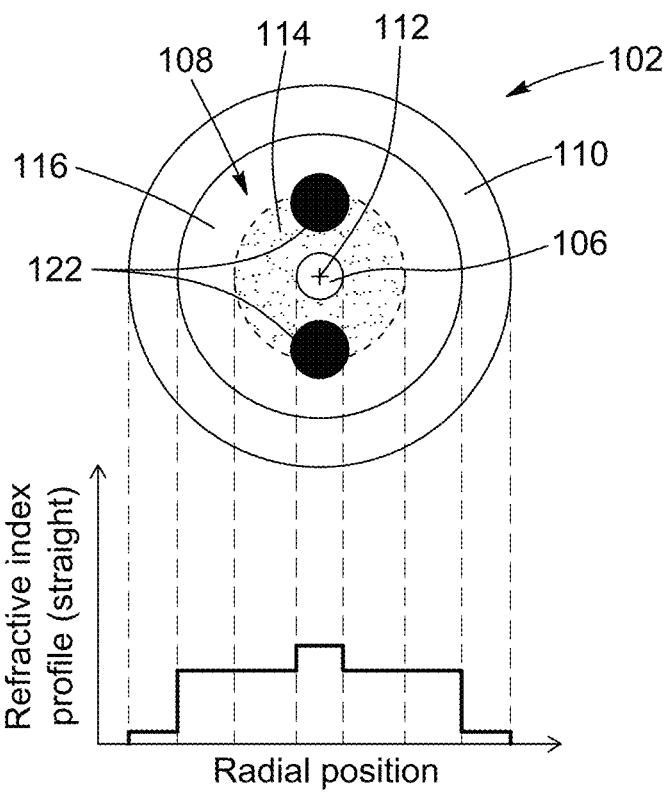
FIG. 5A is a transverse cross-sectional view of an optical fiber, in accordance with another embodiment.
Figure 5B:
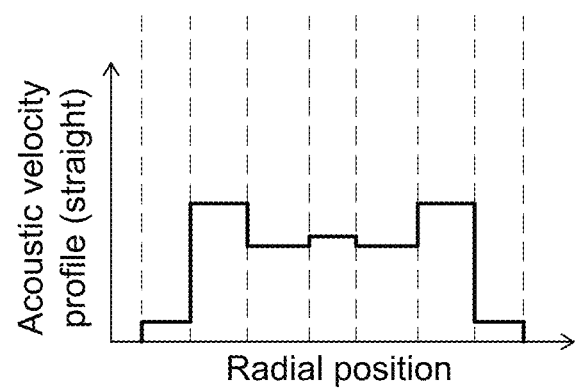
FIGS. 5B to 5D illustrate the radial profiles of the refractive index (FIG. 5B, straight configuration) and longitudinal acoustic velocity (FIG. 5C, straight configuration.
Figure 5C:
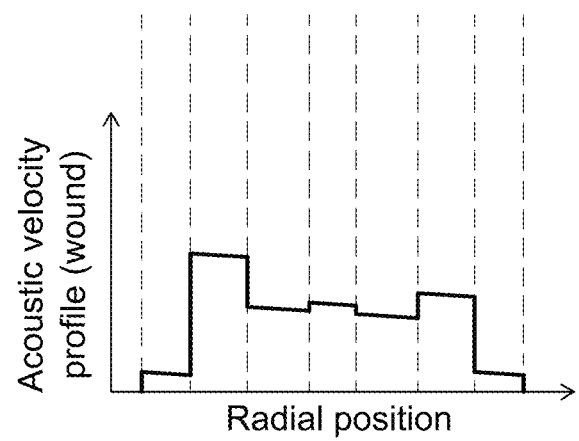
Figure 5D:
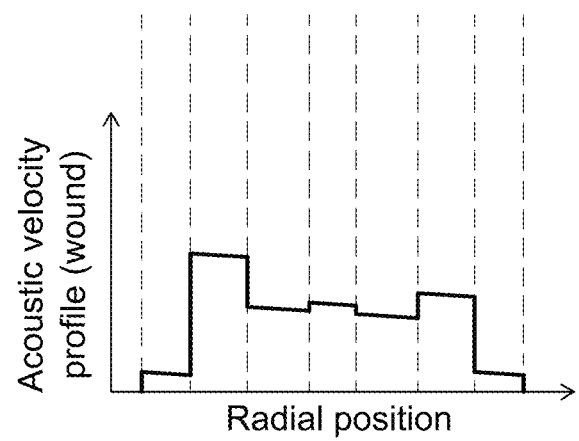

FIG. 5A is a transverse cross-sectional view of an optical fiber 102 which can be wound in a winding arrangement (e.g., onto a winding support 104 such as those depicted in FIGS. 1 and 3) for providing SBS mitigation, in accordance with another embodiment. FIGS. 5B to 5D illustrate the radial profiles of the refractive index (FIG. 5B, straight configuration) and longitudinal acoustic velocity (FIG. 5C, straight configuration; FIG. 5D, wound configuration) of the optical fiber 102. These profiles are the same as those depicted in FIGS. 2B to 2D, but this need not be the case in other embodiments. The optical fiber 102 of FIG. 5A shares several features with that of FIG. 2A, which will not be described again in detail other than to highlight differences between them. In FIG. 5A, the optical fiber 102 includes a core 106, an inner cladding 108 surrounding the core 106, and an outer cladding 110 surrounding the inner cladding 108. The inner cladding 108 has a refractive index that is lower than the refractive index of the core 106, and the outer cladding 110 has a refractive index that is lower than the refractive index of the inner cladding 108, as depicted in FIG. 5B. The optical fiber 102 of FIG. 5A further includes two stress-applying parts (SAPs) 122 disposed within the inner cladding 108 to provide polarization-maintaining operation. In the illustrated embodiment, the SAPs 122 include two stress rods inserted in the inner cladding 108 and extending parallel to the fiber axis 112 along diametrically opposed paths. The SAPs 122 can be made of a material (e.g., boron-doped silica) having a coefficient of thermal expansion that differs from (e.g., typically exceeds) that of the cladding material. In the illustrated embodiment, the SAPs 122 have a circular cross-section, which is known as a PANDA configuration. The number, arrangement, size, and cross-sectional shape of the SAPs 122 may differ in other embodiments.

Referring still to FIG. 5A, the inner cladding 108 includes an inner doped region 114 contiguously surrounding the core 106, and an outer undoped region 116 disposed around the inner doped region 114 and contiguously surrounded by the outer cladding 110. In the illustrated embodiment, the SAPs 122 extend partly inside the inner doped region 114. However, in other embodiments, the SAPs 122 may extend fully inside or fully outside the inner doped region 114. The inner doped region 114 has a composition including a cladding glass material (e.g., silica glass) doped with at least one acoustic-velocity-lowering and refractive-index-raising dopant and at least one acoustic-velocity-lowering and refractive-index-lowering dopant. Non-limiting examples of such dopants are given above. The outer undoped region 116 may be composed of the cladding glass material (e.g., silica glass) without any dopant, while the outer cladding 110 may be composed a low-index glass (e.g., fluorine-doped silica glass) or a low-index polymer. As depicted in FIG. 5C, the composition of the inner doped region 114 is selected to provide the optical fiber 102 with a radial acoustic velocity profile in which the longitudinal acoustic velocity within the inner doped region 114 is equal to or less by at most 0.5% than the longitudinal acoustic velocity within the core 106. As discussed above with respect to FIGS. 4A to 4H, the radial acoustic velocity profile and the winding arrangement of the optical fiber 102 of FIGS. 5A to 5D can provide SBS mitigation by reducing a mode overlap between an optical mode guided in the core 106 and acoustic modes that include at least one guided acoustic mode and at least one leaky acoustic mode. The composition of the inner doped region 114 can also be selected so that its refractive index is left substantially unchanged by doping and, thus, substantially equal to the refractive index of the outer undoped region 116, as depicted in FIG. 5B.

FIG. 6A is a transverse cross-section of an optical fiber 102 which can be wound in a winding arrangement (e.g., onto a winding support 104 such as those depicted in FIGS. 1 and 3) for providing SBS mitigation, in accordance with a further embodiment. FIGS. 6B to 6D illustrate the radial profiles of the refractive index (FIG. 6B, straight configuration) and longitudinal acoustic velocity (FIG. 6C, straight configuration; FIG. 6D, wound configuration) of the optical fiber 102. The optical fiber 102 of FIG. 6A shares several features with that of FIG. 2A, which will not be described again in detail other than to highlight differences between them. In FIG. 6A, the optical fiber 102 includes a core 106, an inner cladding 108 surrounding the core 106, and an outer cladding 110 surrounding the inner cladding 108. The inner cladding 108 has a refractive index that is lower than the refractive index of the core 106, and the outer cladding 110 has a refractive index that is lower than the refractive index of the inner cladding 108, as depicted in FIG. 6B. The inner cladding 108 includes an inner doped region 114 contiguously surrounding the core 106, an additional, intermediate doped region 124 contiguously surrounding the inner doped region 114, and an outer undoped region 116 contiguously interposed between the additional doped region 124 and the outer cladding 110. Both the inner doped region 114 and the additional doped region 124 have compositions including a cladding glass material (e.g., silica glass) doped with at least one acoustic-velocity-lowering and refractive-index-raising dopant and at least one acoustic-velocity-lowering and refractive-index-lowering dopant. Non-limiting examples of such dopants are given above. The outer undoped region 116 may be composed of the cladding glass material (e.g., silica glass) without any dopant, and the outer cladding 110 may be composed a low-index glass (e.g., fluorine-doped silica glass) or a low-index polymer.

As depicted in FIG. 6C, the composition of the inner doped region 114 is selected to provide the optical fiber 102 with a radial acoustic velocity profile in which the longitudinal acoustic velocity within the inner doped region 114 is equal to or less by at most 0.5% than the longitudinal acoustic velocity within the core 106. As discussed above with respect to FIGS. 4A to 4H, the radial acoustic velocity profile and the winding arrangement of the optical fiber 102 of FIGS. 6A to 6D can provide SBS mitigation by reducing a mode overlap between an optical mode guided in the core 106 and acoustic modes that include at least one guided acoustic mode and at least one leaky acoustic mode. As also depicted in FIG. 6C, the composition of the additional doped region 124 is selected to make the longitudinal acoustic velocity within the additional doped region 124 lower than the longitudinal acoustic velocity within the inner doped region 114. The provision of the additional doped region 124 can contribute to further reduce the mode overlap within the core 106 by extending the area of the region where the guided acoustic modes are supported and thereby further reducing their overlap with the fundamental optical mode. In some embodiments, a plurality of additional doped regions may be provided between the inner doped region 114 and the outer undoped region 116, wherein the longitudinal acoustic velocity decreases in a stepwise manner going from the inner doped region to the outermost additional doped region. The compositions of the inner doped region 114 and of the additional doped region 124 can also be selected so that their refractive indices are left substantially unchanged by doping and, thus, substantially equal to the refractive index of the outer undoped region 116.

Figure 7A:
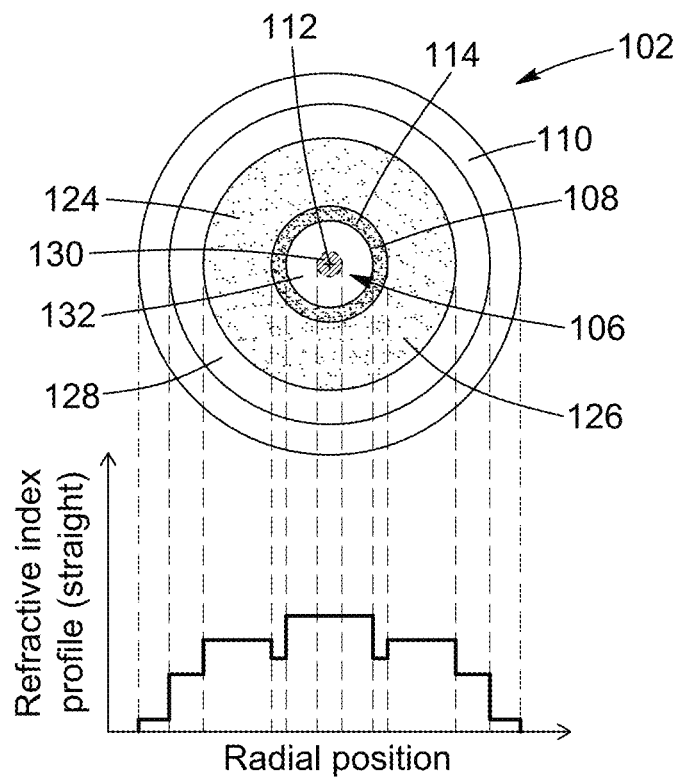
FIG. 7A is a transverse cross-sectional view of an optical fiber, in accordance with another embodiment.
Figure 7B:
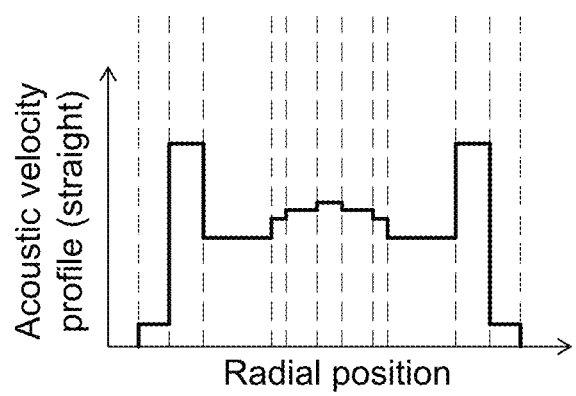
FIGS. 7B to 7D illustrate the radial profiles of the refractive index (FIG. 7B, straight configuration) and the longitudinal acoustic velocity (FIG. 7C, straight configuration.
Figure 7C:
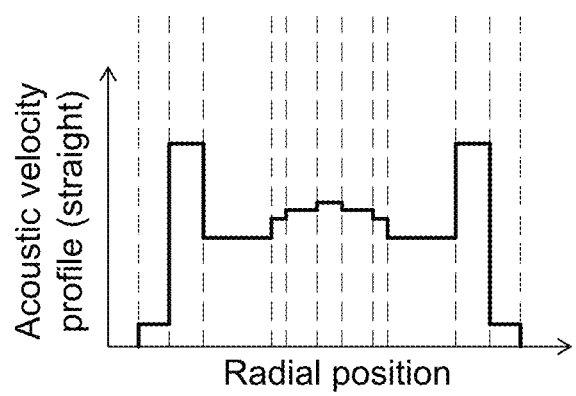
Figure 7D:
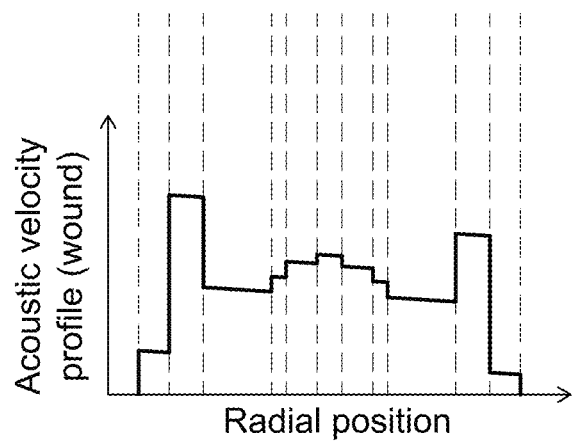

FIG. 7A is a transverse cross-section of an optical fiber 102 which can be wound in a winding arrangement (e.g., onto a winding support 104 such as those depicted in FIGS. 1 and 3) for providing SBS mitigation, in accordance with yet another embodiment. FIGS. 7B to 7D illustrate the radial profiles of the refractive index (FIG. 7B, straight configuration) and longitudinal acoustic velocity (FIG. 7C, straight configuration; FIG. 7D, wound configuration) of the optical fiber 102. The optical fiber 102 of FIG. 7A shares several features with that of FIG. 2A, which will not be described again in detail other than to highlight differences between them. In FIG. 7A, the optical fiber 102 includes a core 106 and four claddings 108, 126, 128, and 110 surrounding the core 106. The four claddings 108, 126, 128, and 110 include, as one moves radially outwardly from the core 106, an inner cladding 108, a first intermediate cladding 126, a second intermediate cladding 128, and an outer cladding 110. As depicted in FIG. 7B, the inner cladding 108 has a refractive index that is lower than the refractive index of the core 106, the first intermediate cladding 126 has a refractive index that is greater than the refractive index of the inner cladding 108 and lower than the refractive index of the core 106, the second intermediate cladding 128 has a refractive index that is lower than the refractive index of the first intermediate cladding 126, and the outer cladding 110 has a refractive index that is lower than the refractive index of the second intermediate cladding 128. Non-limiting examples of multi-cladding fibers having similar refractive index profiles are disclosed in co-assigned U.S. Pat. No. 8,731,358, the contents of which are incorporated herein by reference in their entirety. Such fibers can improve high-order mode bending losses without incurring significant fundamental mode bending losses, for example, to generate near-diffraction-limited laser beams.

The optical fiber 102 includes an inner doped region 114 contiguously surrounding the core 106 and extending through the entirety of the inner cladding 108, and an additional doped region 124 contiguously surrounding the inner doped region 114 and extending through the entirety of the first intermediate cladding 126. Both the inner doped region 114 and the additional doped region 124 have compositions including a cladding glass material (e.g., silica glass) doped with at least one acoustic-velocity-lowering and refractive-index-raising dopant and at least one acoustic-velocity-lowering and refractive-index-lowering dopant. Non-limiting examples of such dopants are given above. The second additional cladding 128 may be composed of an undoped glass material (e.g., silica glass), and the outer cladding 110 may be composed of a low-index glass (e.g., fluorine-doped silica glass) or a low-index polymer. As depicted in FIG. 7C, the composition of the inner doped region 114 is selected to provide the optical fiber 102 with a radial acoustic velocity profile in which the longitudinal acoustic velocity within the inner doped region 114 is equal to or less by at most 0.5% than the longitudinal acoustic velocity within the core 106. As discussed above with respect to FIGS. 4A to 4H, the radial acoustic velocity profile and the winding arrangement of the optical fiber 102 of FIGS. 7A to 7D can provide SBS mitigation by reducing a mode overlap between an optical mode guided in the core 106 and acoustic modes that include at least one guided acoustic mode and at least one leaky acoustic mode. As also depicted in FIG. 7C, the composition of the additional doped region 124 is selected to make the longitudinal acoustic velocity within the additional doped region 124 lower than the longitudinal acoustic velocity within the inner doped region 114. In other embodiments, the longitudinal acoustic velocities within the inner doped region 114 and in the additional doped region 124 can be substantially equal to each other. The provision of the additional doped region 124 can contribute to further reduce the mode overlap within the core 106 by extending the area of the region where the guided acoustic modes are supported and thereby further reducing their overlap with the fundamental optical mode.

Referring still to FIGS. 7A to 7D, the core 106 includes a central region 130 having a central core composition and a peripheral region 132 surrounding the central region 130 and having a peripheral core composition different from the central core composition. In some embodiments, the peripheral core composition can correspond to the core composition of an otherwise conventional optical fiber (e.g., a rare-earth-doped silica core composition in the case of an active LMA fiber), while the central core composition can include additional dopants. The additional dopants can include at least one acoustic-velocity-lowering and refractive-index-raising dopant and at least one acoustic-velocity-lowering and refractive-index-lowering dopant. Non-limiting examples of such dopants are given above. As depicted in FIG. 7C, the central core composition and the peripheral core composition are selected to make the longitudinal acoustic velocity within the core 106 higher in the central region 130 than in the peripheral region 132. Tailoring the acoustic velocity profile of the optical fiber 102 in this manner can be advantageous to reduce the mode overlap within the core 106 and provide SBS mitigation because the leaky acoustic modes are supported mainly in the central region 130 while the optical fundamental mode extends over the entire core 106. The central and peripheral core compositions can also be selected so that the refractive index of the central region 130 remains substantially equal to the refractive index of peripheral region 132, although this is not a requirement.

Numerous modifications could be made to the embodiments described above without departing from the scope of the appended claims.

The invention claimed is:

1. An optical fiber assembly for mitigating stimulated Brillouin scattering (SBS), the optical fiber assembly comprising:
an optical fiber comprising:
a core extending along a longitudinal fiber axis; and
one or more claddings surrounding the core and extending along the longitudinal fiber axis, an innermost one of the one or more claddings having a refractive index that is lower than a refractive index of the core, the one or more claddings comprising an inner doped region contiguous to the core, the inner doped region having a composition comprising a cladding glass material doped with at least one acoustic-velocity-lowering and refractive-index-raising dopant and at least one acoustic-velocity-lowering and refractive-index-lowering dopant, the composition of the inner doped region being selected to provide the optical fiber with a radial acoustic velocity profile in which a longitudinal acoustic velocity within the inner doped region is equal to or less by at most 0.5% than a longitudinal acoustic velocity within the core; and
a winding support configured to hold the optical fiber in a winding arrangement,
wherein the radial acoustic velocity profile and the winding arrangement of the optical fiber provide SBS mitigation by reducing a mode overlap between an optical mode guided in the core and acoustic modes comprising a guided acoustic mode and a leaky acoustic mode.

2. The optical fiber assembly of claim 1, wherein the cladding glass material is silica glass, the at least one acoustic-velocity-lowering and refractive-index-raising dopant comprises germanium oxide, phosphorus oxide, or any combination thereof, and the at least one acoustic-velocity-lowering and refractive-index-lowering dopant comprises boron oxide, fluorine, or any combination thereof.

3. The optical fiber assembly of claim 2, wherein the at least one acoustic-velocity-lowering and refractive-index-raising dopant comprises germanium oxide with a concentration ranging from about 0.1 mol % to about 15.0 mol %, and the at least one acoustic-velocity-lowering and refractive-index-lowering dopant comprises fluorine with a concentration ranging from about 0.1 mol % to about 5.0 mol %.

4. The optical fiber assembly of claim 1, wherein a ratio of an outer diameter of the inner doped region to an inner diameter of the inner doped region ranges from about 1.1 to about 20.

5. The optical fiber assembly of claim 1, wherein the inner doped region extends within the innermost cladding between the core and an outer undoped region of the innermost cladding, and wherein the composition of the inner doped region is selected to provide the inner doped region with a refractive index that matches a refractive index of the outer undoped region.

6. The optical fiber assembly of claim 5, wherein the outer undoped region is made of silica glass.

7. The optical fiber assembly of claim 1, wherein the one or more claddings comprise an additional doped region contiguously surrounding the inner doped region, and wherein a composition of the additional doped region is selected to make a longitudinal acoustic velocity within the additional doped region lower than the longitudinal acoustic velocity within the inner doped region.

8. The optical fiber assembly of claim 7, wherein the additional doped region extends within the innermost cladding.

9. The optical fiber assembly of claim 1, wherein the one or more claddings comprise a plurality of claddings having different refractive indices, and wherein the inner doped region extends through the entirety of the innermost cladding.

10. The optical fiber assembly of claim 1, wherein the one or more claddings comprise an outer cladding contiguously surrounding the innermost cladding, the outer cladding having a refractive index that is lower than the refractive index of the innermost cladding for guiding pump light inside the innermost cladding.

11. The optical fiber assembly of claim 1, wherein the core is composed of a core glass material doped with at least one core dopant.

12. The optical fiber assembly of claim 11, wherein the core glass material is silica glass, and the at least one core dopant comprises germanium oxide, aluminum oxide, phosphorus oxide, fluorine, a rare-earth oxide, or any combination thereof.

13. The optical fiber assembly of claim 1, wherein the core comprises a central region having a central core composition and a peripheral region surrounding the central region and having a peripheral core composition, and wherein the central core composition and the peripheral core composition are selected to make the longitudinal acoustic velocity within the core higher in the central region than in the peripheral region.

14. The optical fiber assembly of claim 1, wherein the core has an outer diameter ranging from about 10 μm to about 60 μm.

15. The optical fiber assembly of claim 1, wherein the winding arrangement has an average winding radius ranging from about 3 cm to about 40 cm.

16. The optical fiber assembly of claim 1, wherein the optical fiber is a polarization-maintaining fiber and comprises at least one stress-applying part disposed within the one or more claddings and extending along the longitudinal fiber axis.

17. The optical fiber assembly of claim 16, wherein the at least one stress-applying part extends at least partly within the inner doped region.

18. An optical fiber having reduced stimulated Brillouin scattering (SBS), the optical fiber comprising:
a core extending along a longitudinal fiber axis; and one or more claddings surrounding the core and extending along the longitudinal fiber axis, an innermost one of the one or more claddings having a refractive index that is lower than a refractive index of the core, the one or more claddings comprising an inner doped region contiguous to the core, the inner doped region having a composition comprising a cladding glass material doped with at least one acoustic-velocity-lowering and refractive-index-raising dopant and at least one acoustic-velocity-lowering and refractive-index-lowering dopant, the composition of the inner doped region being selected to provide the optical fiber with a radial acoustic velocity profile in which a longitudinal acoustic velocity within the inner doped region is equal to or less by at most 0.5% than a longitudinal acoustic velocity within the core, wherein the optical fiber is configured to be wound in a winding arrangement onto a winding support, and wherein the radial acoustic velocity profile and the winding arrangement of the optical fiber provide SBS mitigation by reducing a mode overlap between an optical mode guided in the core and acoustic modes comprising a guided acoustic mode and a leaky acoustic mode.

\* \* \* \* \*